Figure 1:
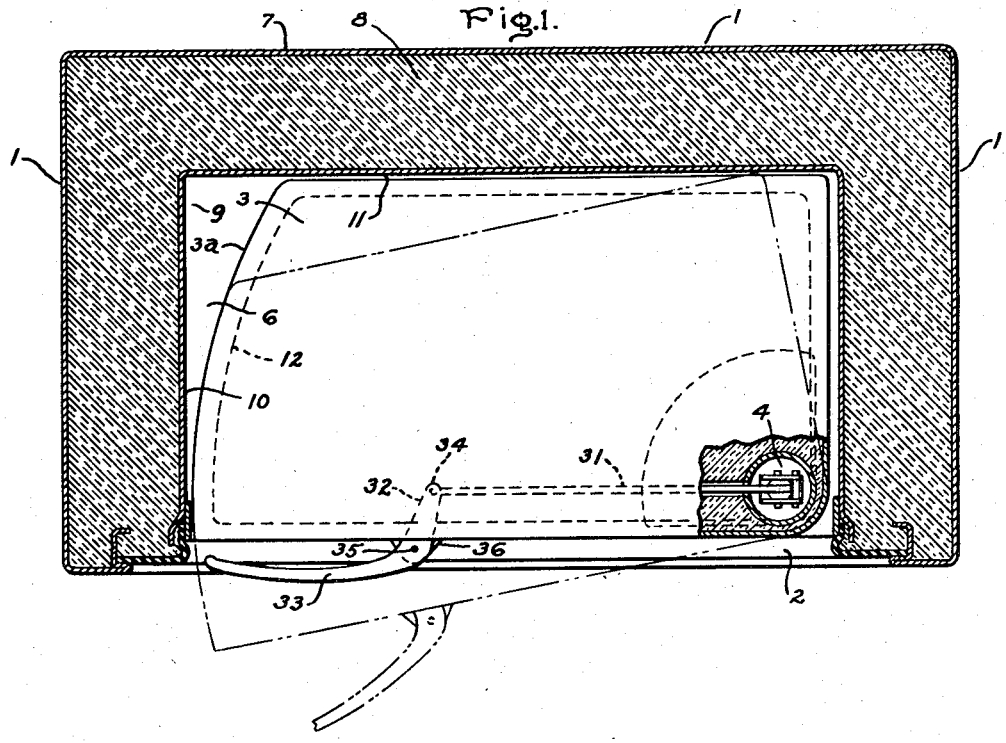

June 26, 1951  L. W. ATCHISON  2,558,602

TWO-TEMPERATURE CABINET

Filed Dec. 2, 1949  2 Sheets-Sheet 1

Inventor:
Leonard W. Atchison,
by William G. Edwards, Jr.
His Attorney.

June 26, 1951 L. W. ATCHISON 2,558,602
TWO-TEMPERATURE CABINET
Filed Dec. 2, 1949 2 Sheets-Sheet 2
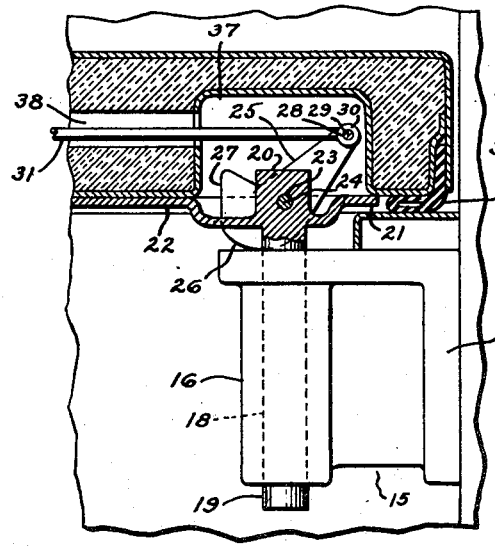
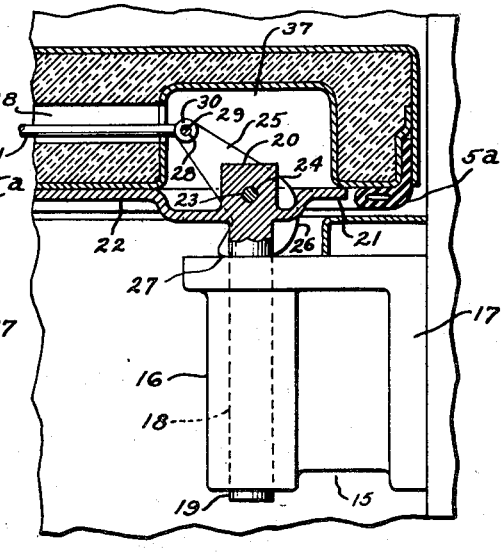
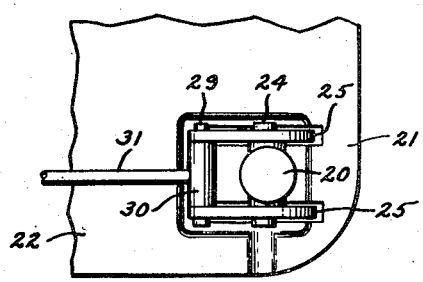
Inventor:
Leonard W. Atchison,
by William G. Edwards, Jr.
His Attorney.

Patented June 26, 1951

2,558,602

UNITED STATES PATENT OFFICE 2,558,602

TWO-TEMPERATURE CABINET

Leonard W. Atchison, Erie, Pa., assignor to General Electric Company, a corporation of New York Application December 2, 1949, Serial No. 130,831

4 Claims. (Cl. 312—320)

This invention relates to refrigerators and, in particular, to a cover for the freezing compartment in a dual temperature refrigerator.

Modern household refrigerators are frequently provided with two food storage compartments; one for foods which are frequently used, and a second, which is maintained at a much lower temperature, for the storage of frozen foods or for those to be kept for a relatively long period of time.

In some household refrigerators, the frozen food compartment is provided in the upper portion of the refrigerator storage space. This type construction permits the cold air from the frozen food storage compartment to flow out towards the bottom of the refrigerator cabinet when a door, placed in the front of the frozen food compartment, is open. This disadvantage is eliminated by locating the frozen food storage compartment in the bottom of a refrigerator cabinet and providing it with a top opening lid. Then, there is no tendency for the cold air from this frozen food storage compartment to spill out to a lower location within the cabinet.

It is an object of this invention to provide an improved cover for a frozen food storage compartment in the bottom of a household refrigerator.

It is a further object of this invention to provide a cover for a frozen food compartment in a household refrigerator that will also serve as a shelf for holding food within the food storage compartment of a household refrigerator.

It is a still further object of this invention to provide a combination cover and food storage shelf for a frozen food compartment in a household refrigerator wherein the cover is movable to give access to the frozen food without disturbing the food stored thereon.

Broadly, this invention comprises a cover for the frozen food compartment in a household refrigerator which serves a secondary function of being a food storage shelf in the main body of the food storage compartment. The cover for the frozen food compartment is first raised and then swung outwardly about an axis located at one corner. The shelf, after being raised, is swung in a horizontal plane, not disturbing any food that may have been placed thereon.

Further objects and advantages of this invention will become apparent and the invention will be more clearly understood from the following description referring to the accompanying drawings and the features of novelty which characterize this invention will be pointed out with particularity in the claims annexed to and forming a part of this specification.

Figure 2:
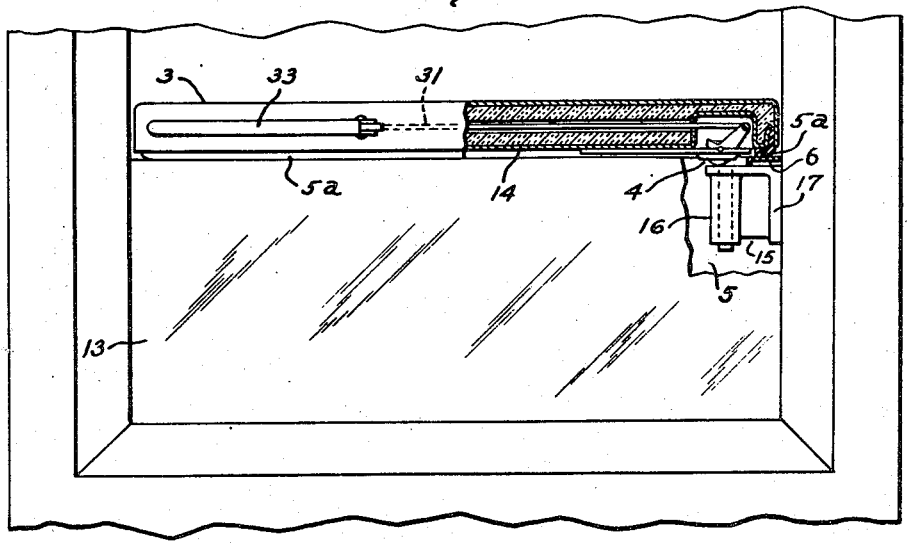

In the drawings, Fig. 1 is a top view, partly in section, showing the cover for a frozen food storage compartment in place, while the dot-dash position of the cover shows its location as it is being opened; Fig. 2 is a front view, partly in section, of a cover and its pivoting support; Fig. 3 is a front view, partly in section, giving an enlarged view of the functioning mechanism of the swingable cover for the food storage compartment; Fig. 4 is a front view, partly in section, showing the cover for a frozen food storage compartment in the raised position; while Fig. 5 is a top view of the mechanism shown in Fig. 4.

Referring to the drawings, a refrigerator cabinet having three vertical sides 1 is shown with an open side 2 which normally is enclosed by a door (not shown). A cover 3 is provided for a frozen food storage compartment positioned in the bottom of the refrigerator storage space. Cover 3, which has a curved portion 3a, is pivotable about a structure 4 located at one of the outer corners of the refrigerator. Walls 1 of the refrigerator comprise an outer shell 7, conventional insulation 8 and an inner shell 9 which forms the walls of the food storage space or compartment 5. A shoulder 6 joins walls 10 and 11 of inner shell 9 and includes a curved portion 12 that complements curved portion 3a of cover 3. When cover 3 is rotated outwardly about pivot structure 4, access is given to frozen food storage compartment 5 which is located therebelow. The dot-dash line position of cover 3 indicates its position in a partially open position.

In the particular embodiment shown, three vertical walls are shown as bordering three sides of the food storage compartment of the refrigerator. The fourth side may be a heavy glass walled portion 13, as shown in Fig. 2, in which case the door to the refrigerator would then be the total length of all the food storage space within the refrigerator. On the other hand, the fourth wall could be of similar construction to the other three, whereupon the main door of the refrigerator could be terminated at the top portion of frozen food storage compartment 5, if desired.

The bottom perimeter of cover 3 is provided with gasket 5a of rubber or other suitable material and this gasket engages the shoulder 6 in the closed position of the cover to seal the access opening of the frozen food storage compartment. Because of the gasket seal, it is necessary that the cover be raised before it can be rotated about its pivot structure 4. Cover 3 is provided with a flat top surface which is available for use as a shelf in the relatively warmer food storage compartment, and it is also provided with bottom surface 14, which is in contact with the air in the frozen food storage compartment. Between the upper and lower portions of cover 3, a suitable insulation material is used to protect the relatively cold or frozen food storage compartment from conducting heat from the relatively warmer food storage compartment.

In order to accomplish the results of raising cover 3 before it is rotated about its pivot, the following mechanism is provided, and may best be understood by reference to Figs. 3, 4 and 5 of the drawings.

A bracket 15 comprising a bushing 16, supported by flanges 17 is attached to the inner wall of the frozen food storage compartment at one of the outer corners, as indicated in Fig. 1 of the drawings. Bushing 16 has a central opening or bearing 18, which guides a shaft 19 which is rotatable and axially slidable within the bearing. The upper portion of shaft 19 is provided with flanges 21 and 22 for securing it to the bottom 14 of cover 3. An extended portion 20 is also provided at the top end of shaft 19 for the positioning of a cam 25 that raises shaft 19 within opening 18 in bushing 16. Extension 20 contains an opening or bore 23 through which a shaft 24 is inserted to support cam 25. It is to be noted that although the following description deals with a pair of cams 25, it would involve no departure from this invention to use a single cam.

Each cam 25 has two operative surfaces; a smooth curved surface or portion 26 having a gradually increasing radius about the shaft or axis 24, and a flat surface 27. Cams 25 are rotatable about shaft 24, which passes through opening 23 in shaft 19. An opening 28 is provided in the uppermost portion of each of the cams 25. A shaft 29, surrounded by a bushing 30, is passed through openings 28 and rotatably secured in position. A generally horizontal shaft 31 is secured to bushing 30 and, when axially moved in one direction or the other, causes cams 25 to rotate about their axis 24 within predetermined limits.

Referring now to Fig. 1 and Fig. 2, shaft 31 extends from bushing 30 to an extension 32 on handle 33. Shaft 31 is rotatably positioned at end portion 34 on extension 32. Handle 33 is rotatably positioned by a pin 35 passing through a bushing 36 rigidly secured to cover portion 3. Handle 33 is arranged to fit within the food storage compartment of the refrigerator not interfering with the closing of the refrigerator door (not shown).

Referring again to Fig. 3, in the lowered position of cover 3, the uppermost portion of cams 25, containing opening 28 therein, is located on one side of the axis of shaft 19, and curved portion 26 of cams 25 is in contact with the uppermost portion of bracket 15. In the raised position of cover 3, however (Fig. 4), the uppermost portion of cams 25 containing opening 28 is on the other side of the axis of shaft 19 and flat portion 27 of cam 25 is in contact with the top portion of bracket 15.

With reference to the drawings, and assuming that the door of the refrigerator is open, exposing the food storage compartment of the relatively warmer section of the refrigerator, the operation of cover 3 is as follows. Handle 33 is pulled outwardly in a horizontal plane rotating counterclockwise about pivot 35 attached to cover 3. Extended portion 32, rigidly connected to handle 33, also moves about pivot point 35 in a counterclockwise direction, pulling with it end portion 34, to which is attached shaft 31. When end portion 34 is moved in a counterclockwise direction, shaft 31 moves to the left, taking with it bushing 30 and shaft 29. When shaft 29 moves to the left, it causes counterclockwise rotation of cams 25 about the shaft 24, and it causes curved surface 26 of cams 25 to slide along the top portion of bracket 17. As cams 25 continue to rotate about their axis 24, shaft 19 is raised in opening 18 of bushing 16, disengaging gasket surfaces 5a from the shoulder 6 of the frozen food storage compartment. As cams 25 continue to rotate about shaft 24, flat surfaces 27 of cams 25 come in contact with the upper portion of bracket 15 to hold opening 23 in extension 20 at a fixed level above the top surface of the bracket. This fixed level is prearranged to be high enough to allow the gasket portion 5a of cover 3 to rotate in a horizontal plane above the upper surfaces of the frozen food storage compartment. Further pull on handle portion 33 causes cover 3 to rotate about its pivot with flat surfaces 27 sliding on the top surface of bracket 15. This movement exposes the frozen food storage compartment. It is to be noted in both the vertical and horizontal movements of cover 3 that any foods placed thereon will not be disturbed, but will move freely with the cover.

When the desired food has been removed from or placed in, the frozen food storage compartment, cover 3 is again rotated about its pivot point with flat surfaces 27 of cams 25 riding on the top portion of bracket 15 until the closed position of the cover is reached. At this point, handle 33 is rotated about axis 35, causing extended portion 32 to move in a clockwise direction. As extended portion 32 moves in a clockwise direction, shaft 31 moves to the right, causing uppermost portion of cams 25 to move to the right and curved portion 26 rides across the top portion of bracket 15. As uppermost portion 28 of cams 25 passes the axis of shaft 19, shaft 19 starts to axially lower into opening 18 of bushing 16 and gasket portion 5a of cover 3 comes into engagement with the shoulder 6 of the frozen food storage compartment to seal the frozen food storage compartment.

Suitable openings 37 and 38 are provided within cover portion 3 of the frozen food storage compartment to allow the predetermined movement of extended portion 32 of handle 33, of shaft 31, and of the uppermost portion 28 of cam 25.

Modifications of this invention will occur to those skilled in the art and it is desired to be understood, therefore, that this invention is not to be limited to the particular arrangement disclosed, but that the appended claims are meant to cover all modifications which are within the spirit and scope of this invention.

What I claim as new and desire to secure by Letters Patent of the United States is:

1. A combined food supporting shelf and cover for a frozen food compartment located in the bottom of a two-temperature refrigerator cabinet, means for engaging said combined shelf and cover to seal said compartment and to prevent rotation of said cover combined shelf and while in the engaged position, said combined shelf and cover including a substantially vertical shaft extending downwardly from one corner thereof, a supporting means for said vertical shaft allowing axial and rotational movement thereof, a mechanical means for lifting said shaft and said combined shelf and cover in relation to said supporting means, and a handle in said combined shelf and cover for operating said mechanical means to raise said combined shelf and cover to a position out of engagement with said engaging means whereby rotation of said combined shelf and cover is permitted.

2. A supporting device providing vertical and rotatable movement for a combined food supporting shelf and cover for a frozen food storage compartment located in the bottom of a two-temperature refrigerator cabinet, said device comprising a substantially vertical shaft extending downwardly from one corner of said combined shelf and cover, a supporting means for said vertical shaft allowing axial and rotational movement thereof, mechanical means for axially moving said vertical shaft, and a handle secured to said combined shelf and cover for operating said mechanical means whereby when said handle is pulled said combined shelf and cover is raised to a position permitting rotation thereof in relation to said supporting means.

3. In a two-temperature refrigerator including means defining a frozen food compartment, a substantially horizontal cover for said compartment, a substantially vertical shaft rigidly secured to said cover, a support bracket rigidly secured to said means at an outer corner of said frozen food compartment, said shaft being in axially slidable and rotational engagement within said bracket, means interpositioned between said shaft and said bracket for regulating the axial location of said shaft in said bracket, and a handle pivotally secured to said cover for operating said last-named means whereby when said handle is pulled said cover is raised to a position permitting swinging movement of said cover about said bracket.

4. In a two-temperature refrigerator cabinet having a frozen food compartment in the lower portion thereof, vertical walls including an upper shoulder defining said frozen food compartment, a combined food supporting shelf and cover adapted to engage said shoulder for closing said compartment, a substantially vertical shaft secured to an outer corner of said combined shelf and cover, a bracket rigidly secured to one of said walls at an outer corner of said compartment, said shaft being in axially slidable and rotational engagement with said bracket, a pair of cams for axially positioning said shaft in said bracket, said cams being rotatably mounted on said shaft and having an axis transverse to the axis thereof, each of said cams having a smooth curved surface with a gradually increasing radius about the axis thereof and a flat surface adjacent the curved surface of greatest radius, a handle pivotally secured to said combined shelf and cover, and means responsive to the movement of said handle for rotating said cams to raise said combined shelf and cover out of engagement with said shoulder to a position permitting horizontal swinging movement of said combined shelf and cover wherein said flat surfaces on said cams are in slidable engagement with said bracket.

LEONARD W. ATCHISON.

No references cited.

Certificate of Correction

Patent No. 2,558,602                                                       June 26, 1951

LEONARD W. ATCHISON

It is hereby certified that error appears in the printed specification of the above numbered patent requiring correction as follows:

Column 4, line 71, after "cover" strike out "combined shelf and" and insert the same before "said" same line;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*